US012798153B2

(12) United States Patent
Glaser et al.

(10) Patent No.: US 12,798,153 B2
(45) Date of Patent: Nov. 17, 2026

(54) TOOL FOR A MOBILE MACHINE TOOL

(71) Applicant: Hilti Aktiengesellschaft, Schaan (LI)

(72) Inventors: Arno Glaser, Schaan (LI); Roland Foser, Ruggell (LI); Werner Kleine, Achim (DE)

(73) Assignee: Hilti Aktiengesellschaft, Schaan (LI)

( * ) Notice: Subject to any disclaimer, the term of this patent is extended or adjusted under 35 U.S.C. 154(b) by 600 days.

(21) Appl. No.: 18/023,783

(22) PCT Filed: Sep. 20, 2021

(86) PCT No.: PCT/EP2021/075788
§ 371 (c)(1),
(2) Date: Feb. 28, 2023

(87) PCT Pub. No.: WO2022/069278
PCT Pub. Date: Apr. 7, 2022

(65) Prior Publication Data

US 2024/0025080 A1 Jan. 25, 2024

(30) Foreign Application Priority Data

Oct. 2, 2020 (EP) ..................................... 20199891

(51) Int. Cl.
*B28D 7/02* (2006.01)
*B28D 1/14* (2006.01)

(52) U.S. Cl.
CPC ............... *B28D 7/02* (2013.01); *B28D 1/146* (2013.01)

(58) Field of Classification Search
CPC ................................. B28D 7/02; B28D 1/146
See application file for complete search history.

(56) References Cited

U.S. PATENT DOCUMENTS 3,499,656 A * 3/1970 Calmusky ............ B25D 17/082 279/19.1
4,113,037 A 9/1978 Wanner et al.
4,474,488 A * 10/1984 Pinkerton ................. F16D 1/02 175/414
11,110,523 B2 * 9/2021 Bierl ................... B23B 51/0486
2012/0063856 A1 * 3/2012 Miwa ................. B23Q 11/0046 408/67
2012/0285749 A1 11/2012 Bohn et al.
2019/0247991 A1 * 8/2019 Hartmann .............. B25D 17/20
2021/0331350 A1 10/2021 Sonntag
2022/0355430 A1 * 11/2022 Eckel ................. B23Q 11/0071

FOREIGN PATENT DOCUMENTS

DE 102018104460 A1 8/2019
DE 102019205656 A1 11/2019
EP 2 522 447 A1 11/2012

OTHER PUBLICATIONS

International Searching Authority, International Search Report and Written Opinion in International Application No. PCT/EP2021/075788, mailed Jan. 17, 2022.

* cited by examiner

*Primary Examiner* — Taras P Bemko
(74) *Attorney, Agent, or Firm* — Leydig, Voit & Mayer, Ltd.

(57) ABSTRACT

A tool for a mobile power tool, for machining rock or mineral materials, comprises a shaft and a tool head, wherein a suction-extraction channel for transporting rock dust is formed at least along a part of the shaft. The tool head and a channel element, which are arranged longitudinally at least along a part of the shaft of the tool, are couplable and/or are coupled to the shaft in a releasable manner.

18 Claims, 4 Drawing Sheets

TOOL FOR A MOBILE MACHINE TOOL

CROSS-REFERENCE TO RELATED APPLICATIONS

This patent application is the U.S. National Stage of International Patent Application No. PCT/EP2021/075788, filed Sep. 20, 2021, which claims the benefit of European Patent Application No. 20199891.1, filed Oct. 2, 2020, which are each incorporated by reference.

The invention is based on a tool for a mobile power tool, in particular a hand-held power tool, for machining rock or mineral materials, comprising a shaft and a tool head, wherein a suction-extraction channel for transporting rock dust is formed at least along a part of the shaft.

Such tools allow rock dust arising during the machining of the rock or of the mineral materials to be removed directly from a machining region of the tool head. Such a tool is therefore used for example in situations in which particularly high requirements are placed on the cleanness of the surroundings adjacent to the machining region.

However, the formation of the suction-extraction channels of tools of the type in question has until now been associated with a considerable cost outlay, for example if the suction-extraction channel is formed as a longitudinal bore in the shaft. It has thus been necessary until now for relatively high use costs to be factored in over the life of the tool.

It is therefore an object of the present invention to offer a tool of the type in question that makes particularly economic use possible.

The object is achieved by a tool for a mobile power tool, in particular a hand-held power tool, for machining rock or mineral materials, comprising a shaft and a tool head, wherein a suction-extraction channel for transporting rock dust is formed at least along a part of the shaft, wherein the tool head and a channel element, which is arranged longitudinally at least along a part of the shaft, of the tool are couplable and/or are coupled to the shaft in a releasable manner.

The idea on which the invention is based here is that of designing a tool of the type in question in a modular manner. In particular, the suction-extraction channel can be formed and/or can be able to be formed by the channel element and the shaft together. It is therefore not necessary for example to bore through the shaft over its length—and hence in a particularly costly manner. The channel element can be able to be pushed and/or can be pushed onto the shaft. The tool head can be couplable and/or can be coupled to the shaft. There thus results, moreover, very simple, quick and cost-effective mounting of the entire tool.

The tool according to the invention is also distinguished by particularly flexible usability. It is thus possible for the tool head to be exchanged as required. Worn tool heads can also be replaced without problem. There is thus no longer any need to dispose of the entire tool and to acquire a completely new tool. In addition, the tool according to the invention allows its overall life to be increased, and therefore costs can also be further reduced as a result.

In particular by exchanging the tool head and/or by exchanging the shaft and/or the channel element, the tool according to the invention can be adaptable to different sizes and/or lengths in a quick and cost-effective manner. It is possible for a large working range to be covered with one shaft thanks to various tool heads of different diameter. The investment costs in relation to known tools can also be reduced to a considerable degree.

The tool can be a drilling tool, for example a hammer drilling tool, a chisel tool or the like. In general, the tool can be particularly preferably designed for use with a drilling machine, a hammer drill, a chisel machine or the like. It is also conceivable, in particular by exchanging the tool head, and depending on the application, to use the tool both as a drilling tool and as a chisel tool. It can also be designed for machining natural or artificial rocks, for example cement-containing rocks. The tool and also the mobile power tool with which the tool is intended to be used can be designed particularly preferably for use in the building sector, for example in civil engineering above and/or below ground. For this purpose, the tool, in particular the tool head, can have, for example, a diameter of at most 50 mm, preferably of at most 40 mm. The tool can have a total length of less than 2 m, in particular of less than 1 m. The mobile power tool can be portable, in particular can have a weight of less than 25 kg.

The mobile power tool can be or comprise a hand-held power tool. It can also be or comprise a construction robot, in particular designed for working in civil engineering above and/or below ground.

The term "couplable" and/or "coupled" can also be understood as meaning a coupling type or coupling which fixes one element to another element in at least one direction. In particular, the channel element can be coupled and/or can be couplable to the shaft in a releasable manner in such a way that, although it cannot be removed radially from the shaft, it is, for example, arrangeable and/or is arranged displaceably along a longitudinal direction of the shaft. For this purpose, the channel element can be able to be pushed and/or can be pushed onto the shaft. The shaft can have a cylindrical or at least a substantially cylindrical shape.

In a particularly preferred embodiment of the invention, the tool head has an inlet channel. The inlet channel can connect a tool tip, that is to say for example an end of the tool head occupied with at least one cutting edge, to the suction-extraction channel. It is thus possible for rock dust generated at the tool tip to be guided through the and/or along the tool head up to the suction-extraction channel. The inlet channel can be formed within the tool head and/or on at least one outer side of the tool head. In particular, the inlet channel can be formed as an inlet groove or comprise at least one inlet groove.

The tool, in particular the tool head, can be formed of a hard metal or contain at least one hard metal. For this purpose, the tool head can contain tungsten carbide, for example. The tool, in particular the tool head, can also contain an alloy. The tool, in particular the tool head, can also contain diamond.

A lateral channel can be formed between the channel element and the tool head. The lateral channel can be annular or at least substantially annular. Such a lateral channel can make it possible for rock dust to be able to be suctioned around the tool head and guided into the suction-extraction channel.

It is also conceivable that the tool has a suction-extraction funnel which is designed to guide into the suction-extraction channel rock dust flowing in from the direction of the tool head. The suction-extraction funnel can be formed as a separate element. Alternatively, the suction-extraction funnel can also form a part of the channel element. For this purpose, the suction-extraction funnel can be formed in one piece on the channel element.

The suction-extraction funnel can be used particularly advantageously in the case of tools having a large diameter, for example having a relatively large diameter of the tool head.

In order to avoid clogging of the suction-extraction channel, the cross-sectional area of the suction-extraction channel can be increased in the region of the shaft, in particular in an end region of the shaft, in a direction pointing away from the tool head.

The channel element can be mountable on the shaft in a simple manner if it is designed in multiple parts and/or to be able to be swung open, in particular able to be swung open longitudinally. For this purpose, the channel element can have at least two half-shells.

The channel element can be arrangeable and/or arranged, in particular mounted, on the shaft in a rotatable manner. Alternatively, it is conceivable to secure the channel element relative to the shaft at least against a relative rotation or to completely fix the channel element to the shaft.

If the channel element is formed as a sleeve element which encloses the shaft, the suction-extraction channel can extend circumferentially at least substantially over the entire shaft. The suction-extraction channel can in particular be designed to be annular or at least substantially annular, in particular encompassing the circumference of the shaft.

Alternatively or additionally, it is also conceivable that the channel element is designed as a covering element which covers over the shaft at least in certain regions. In this case, it is preferred if the tool has a plurality of channel elements. The plurality of channel elements can be arrangeable and/or arranged so as to be distributed uniformly over the circumference of the shaft. At least one of the channel elements can be formed from a plastic.

The channel element can be formed from an elastic material or contain such a material. For this purpose, the channel element can be an elastomer or contain one such. It can also be formed from a plastic, from a rubber and/or from a metal-containing material, for example steel, or contain at least one such. As a result, the suction-extraction channel formed with the channel element can be able to be cleaned in a particularly simple manner, in particular in the case of plastic or rubber.

The channel element and/or the shaft can have at least one fastening means in order to fasten the channel element to the shaft.

The shaft can have at least one suction-extraction groove by means of which a part of the suction-extraction channel is formed and/or can be formed. This is particularly favorable if the channel element is designed as a covering element. Then, the shaft and the channel element designed as a covering element can form the suction-extraction channel. For this purpose, the suction-extraction groove and/or the channel element can be equipped with a dovetail profile. By virtue of the dovetail profile, the channel element can be couplable and/or can be coupled to the shaft in a releasable manner.

In order, even under loading of the tool, to ensure that the suction-extraction channel at least substantially maintains its cross-sectional area, the tool can have at least one spacer for maintaining a suction-extraction space between the shaft and the channel element. The spacer can be formed, for example, on an inner side of the channel element. It is also conceivable that the spacer is formed on the shaft. Preferably, it can be formed from an abrasion-resistant material and/or have an, in particular abrasion-resistant, coating. The spacer can be designed to be knob-shaped. Alternatively or additionally, it can also be spherical or roll-shaped and/or have a partial sphere, a full sphere and/or a roll. Preferably, a plurality of, in particular at least three, spacers can be provided. The plurality of spacers can be arranged so as to be distributed uniformly over the circumference of the shaft.

In a class of embodiments of the invention, the tool head is coupled and/or is couplable to the shaft in a releasable manner by means of a wedge, by means of at least one wedge surface and/or by means of a thread. In the case of a thread, its direction of rotation can be chosen in such a way that the thread automatically tightens during a customary use of the tool, in particular in drilling tools.

Alternatively or additionally, in particular for securing its releasable coupling, the tool head can be coupled and/or can be couplable to the shaft in a releasable manner by means of a coupling pin. For this purpose, the tool, in particular the shaft, can have a pin receptacle which is preferably formed in a complementary manner to the coupling pin. At least one tolerance of the coupling pin and/or of the pin receptacle can be chosen such that the tool head under loading bears against the shaft in a play-free manner or at least substantially play-free manner.

It is also conceivable that the tool has a suction-extraction adapter and/or that the tool can be connected to a suction-extraction adapter. The suction-extraction adapter can be designed to couple the suction-extraction channel to a, for example separate, suction-extraction device which generates a suitable negative pressure. The suction-extraction adapter can also be arranged and/or can be arrangeable on the tool so as to be couplable in a releasable manner.

The modularity of the tool according to the invention can moreover be further increased if a shank arranged at an end of the shaft situated opposite to the tool head is coupled and/or is couplable to the shaft in a releasable manner. It is then possible in a particularly simple manner for the tool to be adapted to different standards of shanks. This can make it easier to use the tool with different mobile power tools. It is also possible in this way for a user of the tool to save considerable costs over the life of the tool.

The pin receptacle can reach into the tool head or reach through the tool head. The pin receptacle can also reach through the channel element. In this case, it is recommended if the channel element is arranged and/or is arrangeable on the shaft in a rotationally fixed manner. Then, the coupling pin can reach both through the channel element and through the tool head and into the shaft or can be correspondingly arrangeable.

The tool head can be able to be plugged onto the shaft. For this purpose, the end of the shaft that faces the tool head can be formed in a tapering manner. Preferably, it can be designed to be wedge-shaped or at least to have at least one wedge surface.

Further features and advantages of the invention emerge from the following detailed description of exemplary embodiments of the invention, with reference to the figures of the drawing, which shows details essential to the invention, and from the claims. The features shown there are not necessarily to be understood as true to scale and are shown in such a way that the special features according to the invention can be made clearly visible. The various features can be implemented individually in their own right or collectively in any combination in variants of the invention.

In the schematic drawing, exemplary embodiments of the invention are shown and explained in more detail in the following description.

In the figures.

In order to make it easier to understand the invention, the same reference signs are used in each case for identical or functionally corresponding elements in the following description of the figures.

Figure 1:
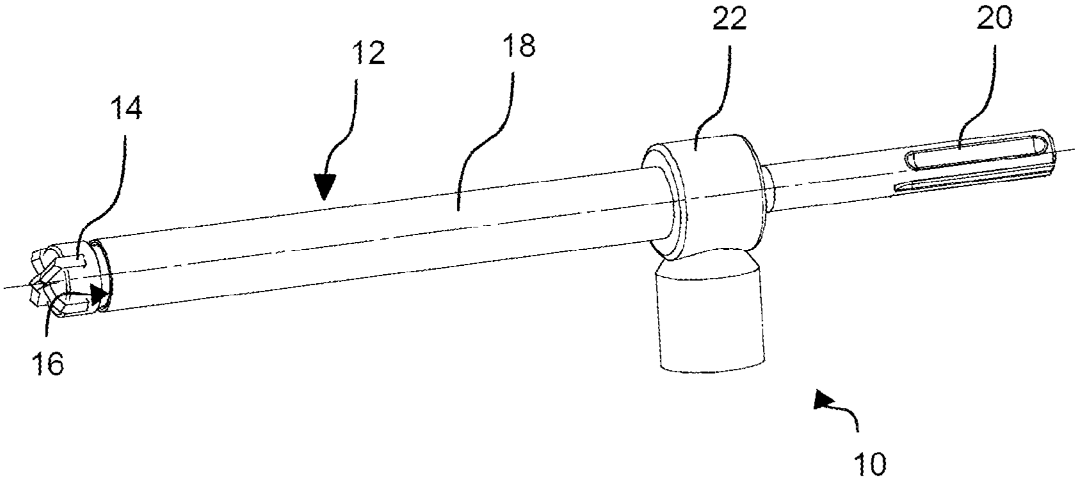
FIG. 1 shows a perspective illustration of a tool having a suction-extraction adapter.

FIG. 1 shows a tool 10. The tool 10 takes the form of a rock drill bit. It can be used with a mobile power tool for machining rock or mineral materials. The tool 10 comprises a shaft 12 and a tool head 14. The tool head 14 is coupled to the shaft 12 in a releasable manner in a way which will be described in further detail below. Along the shaft 12 there is formed a suction-extraction channel 16 for transporting rock dust away from the region of the tool head 14. For this purpose, the tool 10 has a channel element 18 which extends longitudinally along the shaft 12. The channel element 18 encloses the shaft 12. The channel element 18 is thus designed as a sleeve element. The channel element 18 is pushed onto the shaft 12 and thus coupled releasably thereto.

A shank 20 is formed on the shaft 12 at the end of the shaft 12 situated opposite to the tool head 14. The shank 20 can, for example, correspond to the standard which is customarily designated by "SDS-Max".

It can further be seen that a suction-extraction adapter 22 is arranged adjacent to the shank 20. The suction-extraction adapter 22 can be connected to a suction-extraction device. The suction-extraction adapter 22 is fluidically connected to the suction-extraction channel 16. The suction-extraction adapter 22 encloses the shaft 12 together with the channel element 18. The shaft 12 is mounted in the suction-extraction adapter 22 in a rotatable manner together with the channel element 18.

Further exemplary embodiments of tools 10 are presented below. Unless mentioned otherwise, these tools 10 can correspond to the above-described exemplary embodiment and in particular also have one or more of the above-described features. In the following, primarily special features of the respective exemplary embodiments will therefore be explained in more detail.

Figure 2:
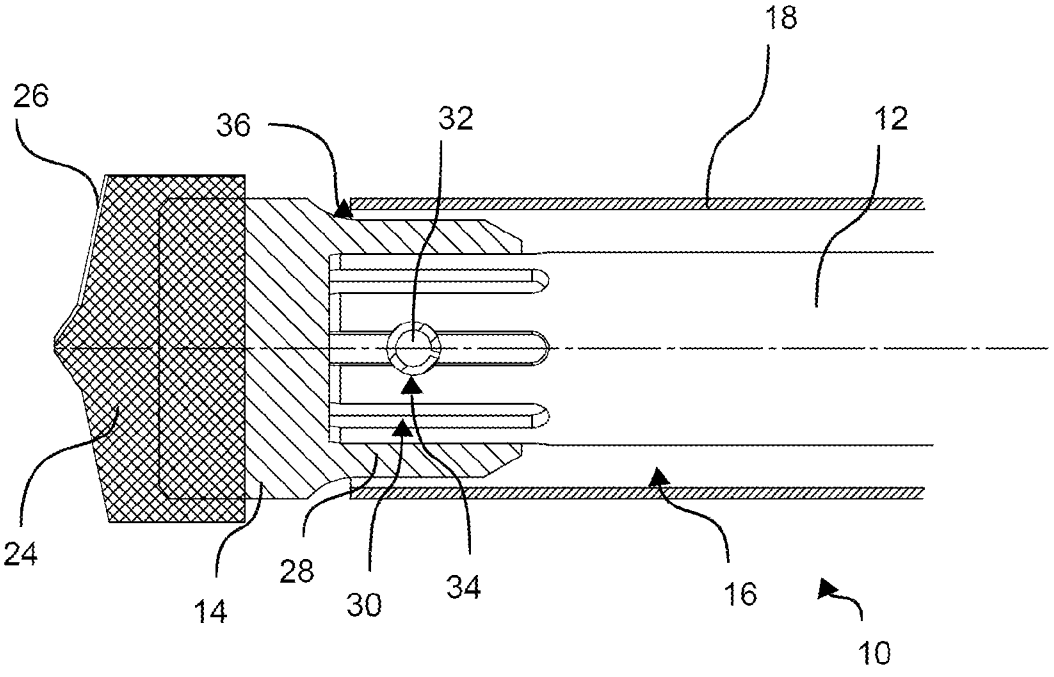
FIG. 2 shows a longitudinal sectional view of a detail of a further tool.

FIG. 2 is a partially sectioned longitudinal sectional view showing a portion of a further tool 10. Its tool head 14 has a tool tip 24 with a plurality of cutting edges 26.

At the end of the tool head 14 situated opposite to the tool tip 24, said tool head has splines 28 which interact with a complementarily formed spline receptacle 30 of the shaft 12 in order to releasably couple the tool head 14 to the shaft 12. To further secure the coupling of the tool head 14 to the shaft 12, this embodiment of the tool 10 has a coupling pin 32 which is plugged into a pin receptacle 34 of the shaft 12. The coupling pin 32 is formed here as a slit hollow pin made of spring steel. Alternatively, however, it is also conceivable to form it, for example, as a notched pin, as a conical pin, as a screw or to form it to have at least one thread.

In this tool 10, a lateral channel 36 is formed between the tool head 14 and a channel element 18. The lateral channel 36 is designed to be annular. It encloses a part of the end of the shaft 12 that faces the tool head 14. The lateral channel 36 can have a width of at least 2 mm, preferably of at least 3 mm.

Rock dust from the tool tip 24 with the cutting edges 26 can be sucked through the lateral channel 36 laterally past the tool head 14 and pass into the suction-extraction channel 16.

It can be seen here in particular that in the mounted state of the tool 10 illustrated in FIG. 2, the cross-sectional area of the lateral channel 36 is substantially smaller than the cross-sectional area of the remaining suction-extraction channel 16. In other words, the cross-sectional area of the suction-extraction channel 16 increases in the region of the shaft 12 starting from the lateral channel 36 to the remaining suction-extraction channel 16 in the direction pointing away from the tool head 14.

Figure 3:
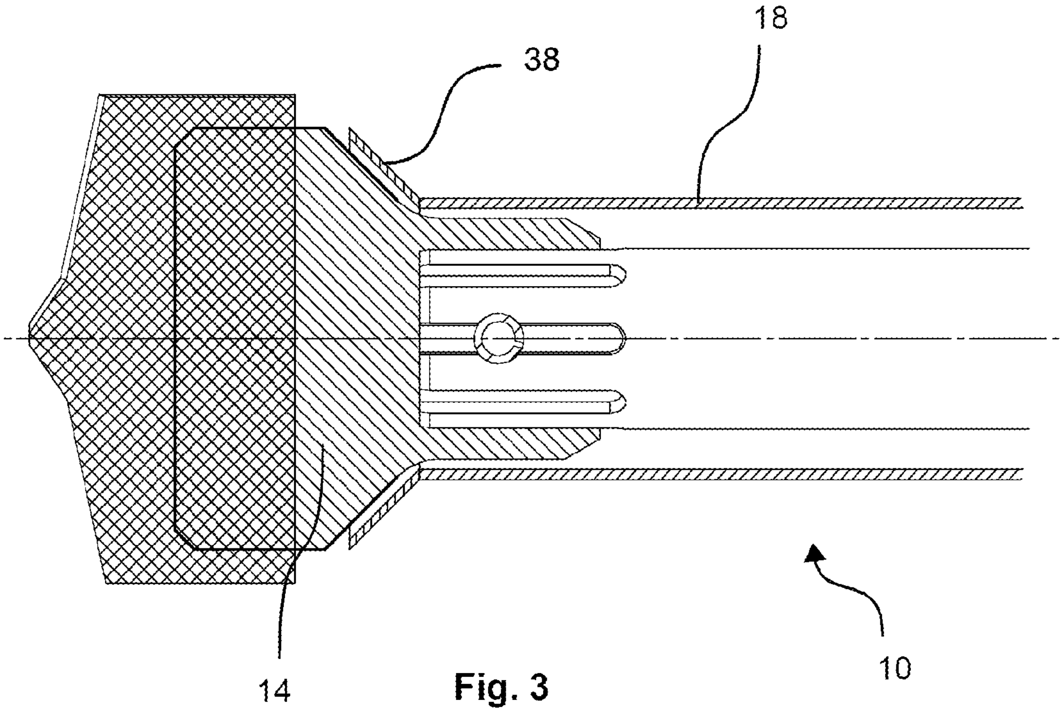
FIGS. 3 to 5 show longitudinal sectional views of details of tools having suction-extraction funnels.

FIG. 3 is a further partially sectioned longitudinal sectional view showing a detail of a further tool 10 having a suction-extraction funnel 38. In this exemplary embodiment, the suction-extraction funnel 38 is part of a channel element 18. In other words, the suction-extraction funnel 38 is formed in one piece on the channel element 18. It is situated at the end of the channel element 18 that faces the tool head 14.

Figure 4:
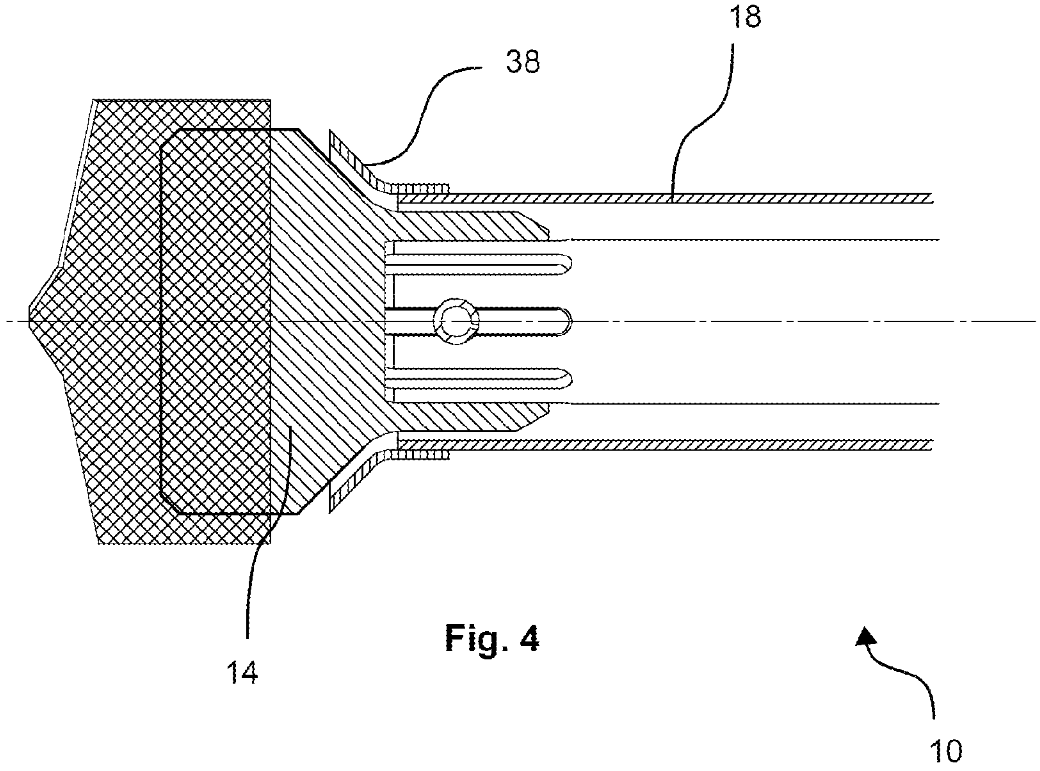

FIG. 4 is a partially sectioned longitudinal sectional view showing a detail of a further exemplary embodiment of a tool 10 which also has a suction-extraction funnel 38. In this exemplary embodiment, however, the suction-extraction funnel 38 is formed as a separate element. It can be pluggable and/or it can be plugged onto a channel element 18.

Figure 5:
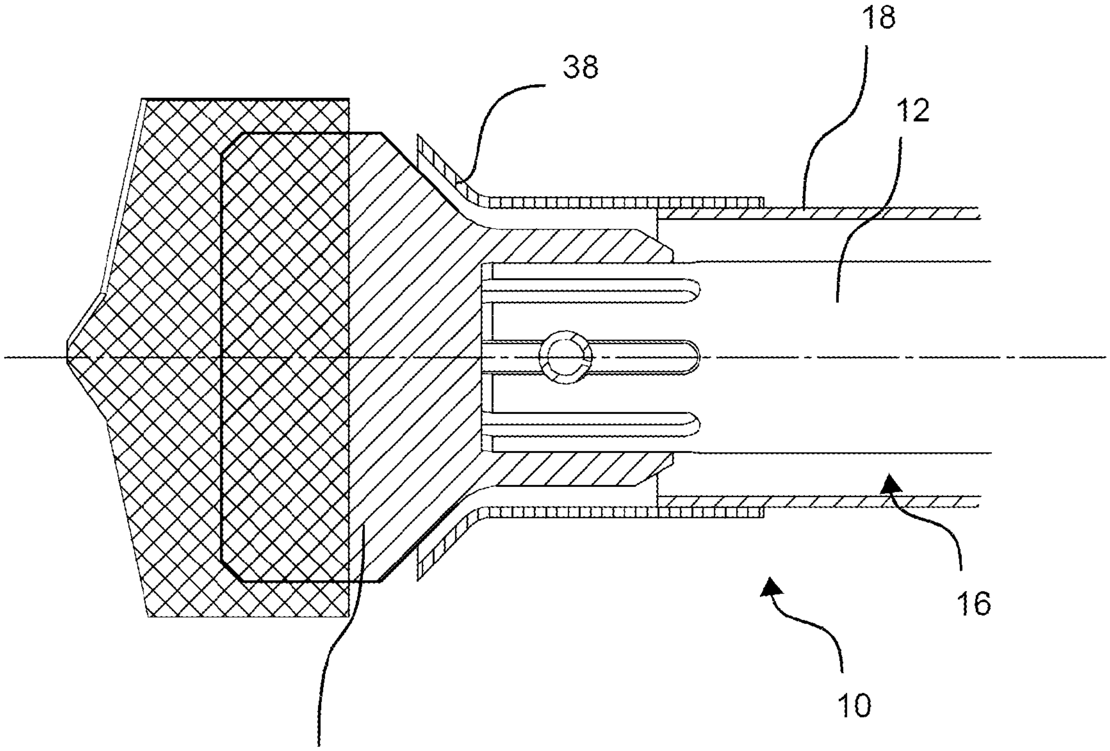

A further exemplary embodiment in which a suction-extraction funnel 38 is formed as a separate element is shown in FIG. 5 in a further partially sectioned longitudinal sectional view of a detail of a further tool 10.

What can be seen in this exemplary embodiment, by contrast with the preceding exemplary embodiment, is that the suction-extraction funnel 38 can also be designed to extend a channel element 18, at least over a part of a tool head 14, in a direction parallel to a shaft 12. As a result, the suction action of a negative pressure prevailing in a suction-extraction channel 16 can be improved. This is appropriate, for example, in the case of relatively large tool heads 14.

Figure 6:
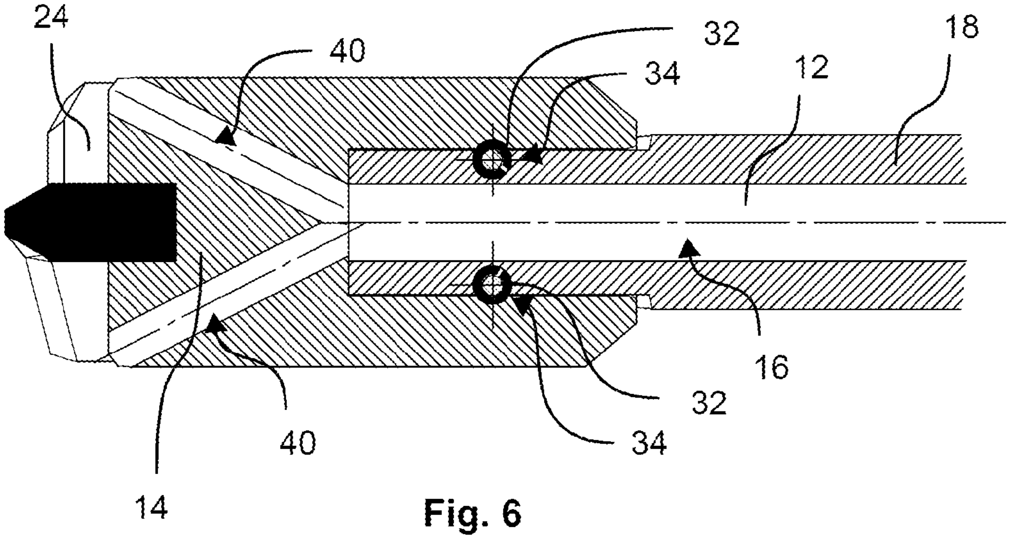
FIG. 6 shows a longitudinal sectional view of a detail of a tool in which the tool head has a plurality of inlet channels.

FIG. 6 is a longitudinal sectional view showing a further tool head 14 in conjunction with a shaft 12, which is only partially depicted in FIG. 6.

A plurality of, for example 2, 3 or 4, inlet channels 40 are formed in the tool head 14. It is also conceivable to provide only a single inlet channel 40. The inlet channels 40 run through the tool head 14. They connect a tool tip 24 of the tool head 14 to a suction-extraction channel 16.

The suction-extraction channel 16 is formed as a central longitudinal opening in the shaft 12. For this purpose, the shaft 12 is formed from two half-shells. The two half-shells can be releasably coupled to one another by way of a connection means, for example a strap or a latching arrangement, which, for reasons of simplification, is not illustrated in FIG. 6. Consequently, at least one of the two half-shells simultaneously forms a channel element 18.

The tool head 14 is releasably coupled to the shaft 12 by means of a plurality of coupling pins 32 in conjunction with pin receptacles 34 formed in a complementary manner on the shaft 12.

Figure 7:
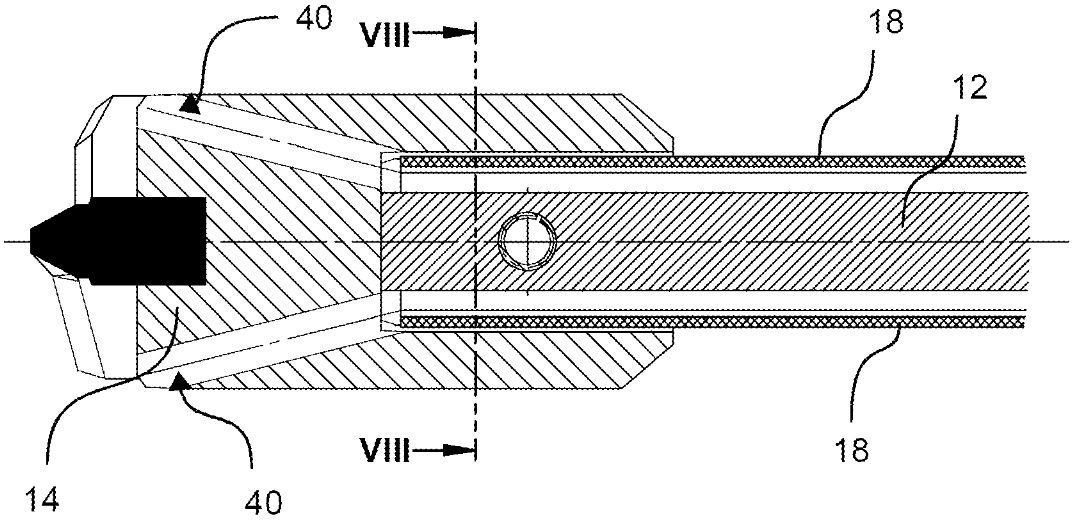
FIG. 7 shows a longitudinal sectional view of a detail of a tool in which a plurality of channel elements are designed as covering elements.
Figure 8:
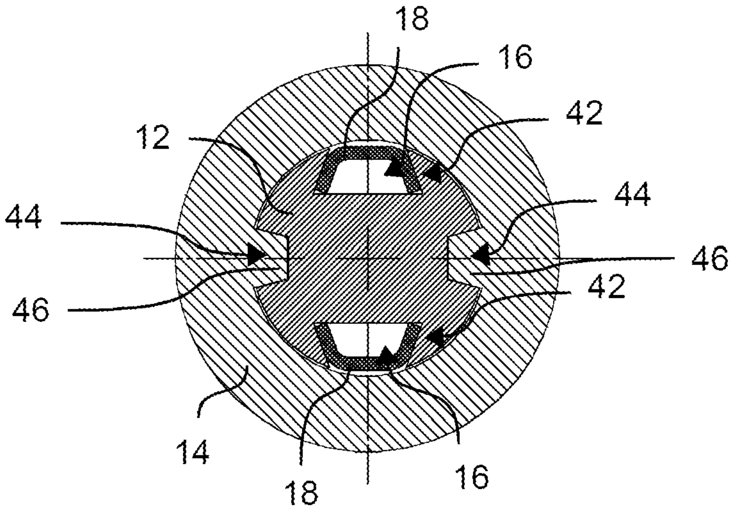
FIG. 8 shows a cross-sectional view of the tool according to FIG. 7.

Whereas in the previous exemplary embodiments the channel elements 18 are designed as sleeve elements, FIG. 7 and FIG. 8 show an exemplary embodiment in which channel elements 18 are designed as covering elements.

For this purpose, FIG. 7 shows a longitudinal sectional view of the exemplary embodiment. FIG. 8 shows a cross-sectional view corresponding to the section line VIII-VIII from FIG. 7 of this exemplary embodiment.

There can again be seen a tool head 14 which is releasably coupled to a shaft 12. The shaft 12 has an at least substantially circular cross section. It is conceivable alternatively that the shaft 12 has a, not even substantially, noncircular cross section. For example, the shaft 12 can have a polygonal cross section or an at least substantially polygonal cross section.

On the circumference of the shaft 12 there are formed two suction-extraction channels 16 which run along a longitudinal axis of the shaft 12. For this purpose, two suction-extraction grooves 42 are incorporated in the shaft 12. As can be seen in particular by way of FIG. 8, the suction-extraction grooves 42 are covered over by a respective channel element 18. In other words, the channel elements 18 are designed as covering elements which are configured to cover over the suction-extraction grooves 42.

For this purpose, the suction-extraction grooves 42 are shaped in cross section to be complementary to the channel elements 18 designed as covering elements. As can be seen in particular by way of FIG. 8, the lateral walls of the suction-extraction grooves 42, on the one hand, and of the channel elements 18, on the other hand, run obliquely, in particular along noncentral chords. The suction-extraction grooves 42 and the channel elements 18 thus have dovetail profiles, which are formed in particular to be complementary to one another, with the result that the elements 18 and 42 are releasably couplable to one another in the manner of dovetail connections, and are coupled according to the state illustrated in FIG. 7 and FIG. 8.

The channel elements 18 are formed from an elastic plastic. In an alternative embodiment, they are formed from an elastic rubber.

In order to be able to couple the tool head 14 to the shaft 12 in a rotationally secured manner, there are furthermore incorporated a plurality of coupling grooves 44 on the circumference of the shaft 12 into which complementarily formed coupling lugs 46 of the tool head 14 can engage, or do engage in the state according to FIG. 7 and FIG. 8.

Analogously to the above-described exemplary embodiments, the tool head 14 likewise has one or more inlet channels 40. However, in order to allow a fluidic connection from the inlet channels 40 to the respectively assigned suction-extraction channels 16, the inlet channels 40 run flatter in the longitudinal direction of the shaft 12, with the result that they can run out in the region of the circumference of the shaft 12 and open into the respective suction-extraction channels.

It will be understood that the embodiments of tool heads 14 that are illustrated in these exemplary embodiments can be combined in any desired manner, in particular not only in the above-illustrated pairings, with the above-illustrated shafts 12, where appropriate with suitable adaptation of the geometries. Thus, for example, a combination of a tool head 14 having one or more inlet channels 40 with a shaft 12 having a suction-extraction funnel 38 is also conceivable.

The invention claimed is:

1. A tool for a mobile power tool for machining rock or mineral materials, the tool comprising a shaft and a tool head, wherein a suction-extraction channel for transporting rock dust is formed at least along a part of the shaft, the shaft having at least one suction-extraction groove formed thereon, and wherein the tool head and a channel element, which are arranged longitudinally at least along a part of the shaft, of the tool are couplable and/or are coupled to the shaft in a releasable manner, the channel element having a dovetail profile, wherein the channel element is arranged within the at least one suction-extraction groove, and the tool head is coupled and/or is couplable to the shaft in a releasable manner by a wedge, by at least one wedge surface and/or by a coupling pin.

2. The tool as claimed in claim 1, wherein the tool head has an inlet channel.

3. The tool as claimed in claim 2, wherein a lateral channel is formed between the channel element and the tool head.

4. The tool as claimed in claim 2, wherein the tool has a suction-extraction funnel which is designed to guide into the suction-extraction channel rock dust flowing in from a direction of the tool head.

5. The tool as claimed in claim 1, wherein a lateral channel is formed between the channel element and the tool head.

6. The tool as claimed in claim 1, wherein the tool has a suction-extraction funnel which is designed to guide into the suction-extraction channel rock dust flowing in from a direction of the tool head.

7. The tool as claimed in claim 1, wherein the cross-sectional area of the suction-extraction channel is increased in a region of the shaft in a direction pointing away from the tool head.

8. The tool as claimed in claim 7, wherein the cross-sectional area of the suction-extraction channel is increased in an end region of the shaft in the direction pointing away from the tool head.

9. The tool as claimed in claim 7, wherein the cross-sectional area of the suction-extraction channel is increased in the region of the shaft in the direction pointing away from the tool head.

10. The tool as claimed in claim 1, wherein the channel element is designed in multiple parts and/or is designed to be able to be swung open.

11. The tool as claimed in claim 10, wherein the channel element is able to be swung open longitudinally.

12. The tool as claimed in claim 1, wherein the channel element is designed as a sleeve element which encloses the shaft.

13. The tool as claimed in claim 1, wherein the channel element is designed as a covering element which covers over the shaft only in certain regions.

14. The tool as claimed in claim 13, wherein the covering element consists of an elastic material, plastic, and/or a rubber.

15. The tool as claimed in claim 1, wherein the shaft has the at least one suction-extraction groove by which at least one part of the suction-extraction channel is formed and/or can be formed.

16. The tool as claimed in claim 1, wherein the tool has at least one spacer for maintaining a suction-extraction space between the shaft and the channel element.

17. The tool as claimed in claim 1, wherein the tool has a suction-extraction adapter and/or the tool can be connected to a suction-extraction adapter.

18. The tool as claimed in claim 1, wherein a shank arranged at an end of the shaft situated opposite to the tool head is coupled and/or is couplable to the shaft in a releasable manner.

* * * * *